United States Patent [19]

Ronan

[11] Patent Number: 5,796,897
[45] Date of Patent: Aug. 18, 1998

[54] UNIVERSAL ADAPTOR FOR KEYED FIBEROPTIC CONNECTORS

[75] Inventor: Gregory J. Ronan, Palo Alto, Calif.

[73] Assignee: Wave Optics, Inc., Mt. View, Calif.

[21] Appl. No.: 794,385

[22] Filed: Feb. 6, 1997

[51] Int. Cl.[6] .................................................. G02B 6/36
[52] U.S. Cl. .............................. 385/76; 385/77; 385/78; 385/55; 385/65
[58] Field of Search ................................. 385/76, 60, 72, 385/77, 78, 55, 53, 65, 83

[56] References Cited

U.S. PATENT DOCUMENTS 5,633,975   5/1997   Gary et al. ............................. 385/147

*Primary Examiner*—Phan T. H. Palmer
*Attorney, Agent, or Firm*—Townsend and Townsend and Crew LLP

[57] ABSTRACT

The present invention provides for an improved adaptor for a fiber optic connector having a ferrule and a key for rotational alignment of the connector to the adaptor. The adaptor has a V-shaped slot to receive the connector key to avoid criticality in matching the key size to the slot.

12 Claims, 2 Drawing Sheets

5,796,897

UNIVERSAL ADAPTOR FOR KEYED FIBEROPTIC CONNECTORS

BACKGROUND OF THE INVENTION

The present invention is related to connectors for optical fibers and, more particularly, to adapters for receiving those connectors having keys.

In fiberoptic systems, such as networks, the optical fibers are terminated with a connector so that the fiber can be mechanically and optically connected to optical devices, such as lasers, or to another optical fiber. For certain optical fibers, such as polarization maintaining fibers and fibers with angle-polished endfaces, it is critical that the first optical fiber be rotationally aligned properly with the device or the second optical fiber. Such optical fibers use a connector having a key which is used as a reference point to which the fiber is rotationally aligned and fixed.

The key in such connectors is a peg, or protrusion, which extends perpendicularly from the longitudinal axis of the connector and the end of the optical fiber held in the connector. Presently, the adapters which mate with the keyed fiber optic connectors must be matched to the connector. The adaptors have a U-shaped slot which is sized to precisely fit the key of a connector when the connector and adaptor are mated. If the slot in the adaptor is not matched with the key of the connector, either the key is too large for the slot and the connector and adaptor cannot mate completely, or the key is too small for the slot and there is play in the rotational direction between the connector and adaptor.

Thus, connectors and adaptors must be matched precisely. For each connector having a different key size, there must be a specific adaptor. This situation causes annoyance and additional costs where mismatched adaptors and connectors are purchased. Furthermore, additional inventory of parts may be required.

The present invention avoids this situation with a universal adaptor which can mate with connectors of varying sized keys, yet maintains rotational precision.

SUMMARY OF THE INVENTION

The present invention provides for an improved adaptor for a fiber optic connector having a ferrule and a key for rotational alignment of the connector to the adaptor. The adaptor has an alignment sleeve for receiving the connector ferrule and a housing. The housing has a threaded barrel and a flange fixed to and extending perpendicularly from the threaded barrel. The threaded barrel coaxially mounts the sleeve within the barrel and has a wall displaced from the sleeve. The wall terminates in an edge, which has a V-shaped slot therein to receive the connector key without the criticality of matching the key size to the slot.

DETAILED DESCRIPTION OF PREFERRED EMBODIMENTS

Figure 1:
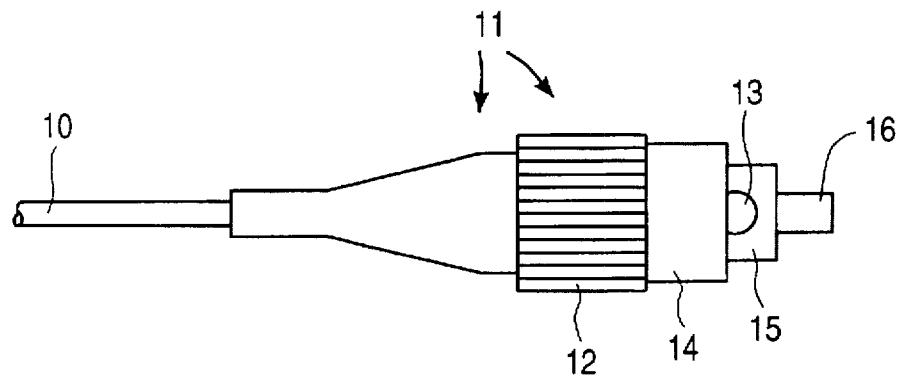
FIG. 1 is a prior art fiber optic connector having a key to provide a reference for rotational alignment of the connector.

FIG. 1 illustrates a keyed fiber optic connector 11 found in the prior art. The connector has a ferrule 16, which holds an unjacketed end of an optical fiber 10, and a housing formed by a barrel 15 and rotatable sleeve nut 14, both of which are axially aligned with the ferrule 16 and optical fiber. The barrel 15 holds the ferrule 16. A key 13, or peg, is fixed to the barrel 15 and extends perpendicularly from the longitudinal axis of the connector 11. The key 13 is shown as rounded in cross-section. However, the key 13 may be shaped differently, such as with a square cross-section, for example, or some other shaped protrusion from the barrel 15.

The nut 14 engages the barrel 15 such that the nut 14 is capable of rotation about the longitudinal axis barrel 14, but is not capable of movement along the axis. A common example of this type of nut is the nut found on the terminal fitting of a garden house for connection to a faucet. The nut 14 has threads on the inside (and therefore not shown in the drawings) and has a raised knurled portion 12 for easier turning of the nut 14.

Figure 2A:
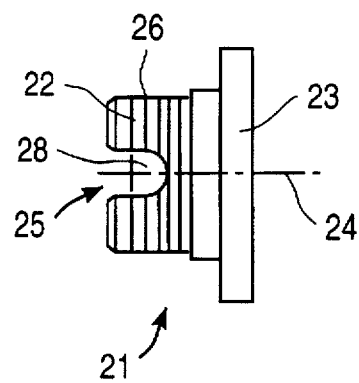
FIG. 2A is a sideview of a prior art adaptor which receives the fiber optic connector of FIG. 1.
Figure 2B:
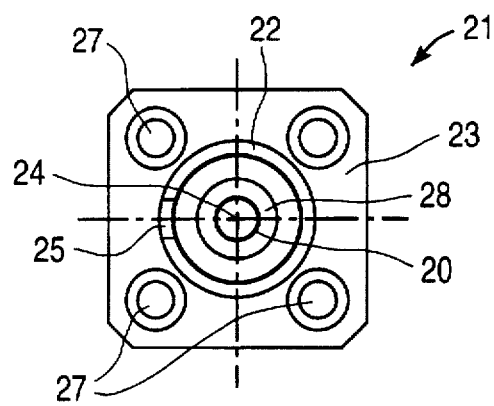
FIG. 2B is a frontview of a prior art adaptor of FIG. 2A.

FIGS. 2A and 2B illustrate the adaptor 21 which is presently used to mate with the connector of FIG. 1. The adaptor 21 has a housing formed by a threaded barrel 22 and flange 23. Inside the barrel 22 and about a central axis 24 of the barrel 22 and adaptor 21, there is a cylindrical opening which receives a hollow cylindrical insert 28. The cylindrical insert 28, in turn, a resilient alignment sleeve 20 having an inner diameter large enough to receive the ferrule 16 of the connector 11. The alignment sleeve 20 is split along its length to act as a spring to reduce the need for precise sizing control with respect to the diameter of the ferrule 16. Stated differently, the sleeve 20 forms a hollow cylinder with a gap along its length; in cross-section, the cylinder forms a split ring, or a "C", to accommodate slight differences in the diameters of ferrules 16 of the connectors 11.

The barrel 15 of the connector 11 fits over the alignment sleeve 20 and under the barrel 22 of the adaptor 21. The threaded nut 14 fits over the barrel 22 of the adaptor 21, and the threads on the inside of the barrel 14 engage threads 26 on the outside of the barrel 22. The adaptor 21 has a U-shaped slot 25 to engage the key 13. Thus, if the key 13 is too large for the slot 25, the connector 11 and the connector 21 cannot completely mate. On the other hand, if the diameter of the key 13 is much smaller than the width of the slot 25, there is rotational play and the precise rotational alignment between the connector 11 and the adaptor 21 is compromised. The elements of the adaptor 21 are formed from stainless steel, brass, and other metals.

The frontview of the adaptor 21, shown in FIG. 2B, also illustrates holes 27 in the flange 23 for accepting screws by which the adaptor 21 can be mounted to a wall of an optical unit or to a second adaptor 21 for a back-to-back mounting. The back-to-back mounting allows two connectors 11 to be joined.

Figure 3A:
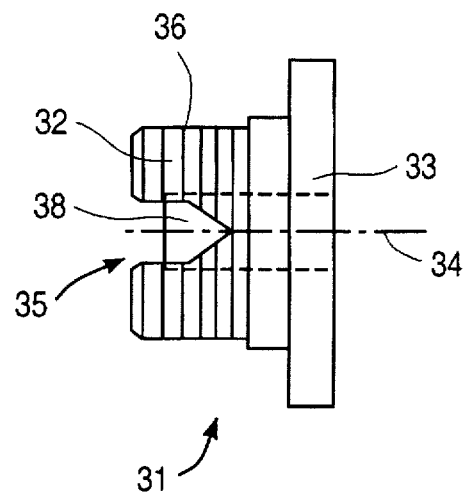
FIG. 3A is an improved fiber optic adaptor according to the present invention.

FIG. 3A illustrates an adaptor 31 according to the present invention. The adaptor 31 has an alignment sleeve 30, insert 38 and a housing formed by a flange 33 and threaded barrel 32. For better wear, the alignment sleeve 30 may be entirely ceramic or with a ceramic layer lining the inner walls of the sleeve 30.

Instead of a U-shaped slot found in the prior art, the adaptor 31 has a slot 35 which terminates in a V-shape. The V-shape of the slot 35 permits the adaptor 31 to receive connectors having keys of varying sizes. Nonetheless, the slot 35 provides a precise rotational alignment of the key in the connector with respect to the adaptor. When the key 13 of any size engages both sides of the slot 35, the connector 11 is rotationally locked to the adaptor 31. While the slot in the adaptor 31 could be entirely shaped as a "V", the slot 35 is believed to be superior. The straight sides of the slot 35 prevent the key of a connector from slipping out as the nut 14 of the connector is tightened.

Figure 3B:
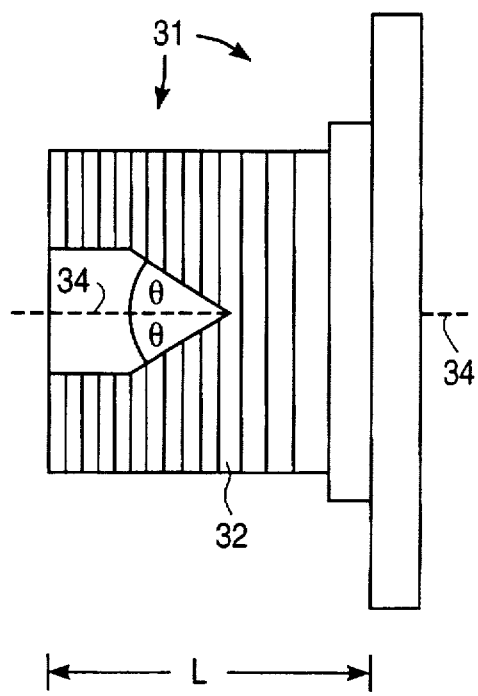
FIG. 3B is a detail of the adaptor of FIG. 3A.

FIG. 3B illustrates a detail of the slot 35. A slot terminus making an angle θ in the range from 30° to greater than 45° with respect to the longitudinal axis 34 of the barrel 32 (and adaptor 31) has been found to work effectively. An angle θ equal to 45° is believed to be optimum. The length of the slot ranges from 0.2 L to 0.4 L, where L is the length of the barrel 32. L is approximately 0.3 inches in the described embodiment. It has been found that a slot length of approximately 0.3 L, or, more precisely, 0.29 L, works optimally.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. A universal adaptor for a fiber optic connector having a ferrule and a key for rotational alignment of said connector to said adaptor, said adaptor comprising an alignment sleeve for receiving said connector ferrule; and a housing having a threaded barrel and a flange fixed to and extending perpendicularly from said threaded barrel, said threaded barrel coaxially mounting said sleeve within said barrel and having a wall displaced from said sleeve, said wall terminating in an edge, said edge having a V-shaped slot therein;

whereby criticality of key size matching to said slot is avoided.

2. The universal adaptor of claim 1 wherein said edge of said barrel wall is a predetermined distance from said flange, said V-shaped slot extending in the range of 0.2 to 0.4 of said predetermined distance from said edge toward said flange.

3. The universal adaptor of claim 2 wherein said said V-shaped slot extends approximately 0.3 of said predetermined distance from said edge toward said flange.

4. The universal adaptor of claim 3 wherein said said V-shaped slot extends 0.29 of said predetermined distance from said edge toward said flange.

5. The universal adaptor of claim 1 wherein said V-shaped slot has two sides forming said slot, each side forming an angle in the range of 30° to 45° with respect to said edge.

6. The universal adaptor of claim 5 wherein each side forms an angle of approximately 45° with respect to said edge.

7. In an adaptor for receiving a fiber optic connector having a ferrule and a key for rotational alignment of said connector to said adaptor, said adaptor having an alignment sleeve for receiving said connector ferrule, and a housing having a threaded barrel and a flange fixed to and extending perpendicularly from said threaded barrel, said threaded barrel coaxially mounting said sleeve within said barrel and having a wall displaced from said sleeve, said wall terminating in an edge, an improvement comprising a V-shaped slot in said edge to avoid criticality of connector key size matching to said slot.

8. The improvement of claim 7 wherein said edge of said barrel wall is a predetermined distance from said flange, said V-shaped slot extending in the range of 0.2 to 0.4 of said predetermined distance from said edge toward said flange.

9. The improvement of claim 8 wherein said V-shaped slot extending approximately 0.3 of said predetermined distance from said edge toward said flange.

10. The improvement of claim 9 wherein said V-shaped slot extending 0.29 of said predetermined distance from said edge toward said flange.

11. The improvement of claim 7 wherein said V-shaped slot has two sides forming said slot, each side forming an angle in the range of 30° to 45° with respect to said edge.

12. The improvement of claim 11 wherein each side forms an angle of approximately 45° with respect to said edge.

* * * * *